US006969482B2

(12) United States Patent
Yang

(10) Patent No.: US 6,969,482 B2
(45) Date of Patent: Nov. 29, 2005

(54) METHOD FOR POLYCHROME PLASTIC MATERIAL INJECTION MOLDING

(76) Inventor: Teng-Jen Yang, No. 13, Alley 2, Lane 67, Ji Fen Rd., Wu Feng Hsiang, Taichung Hsien (TW)

( * ) Notice: Subject to any disclaimer, the term of this patent is extended or adjusted under 35 U.S.C. 154(b) by 288 days.

(21) Appl. No.: 10/408,297

(22) Filed: Apr. 7, 2003

(65) Prior Publication Data

US 2004/0195722 A1 Oct. 7, 2004

(51) Int. Cl.$^{7}$ ................................................ B29C 45/04

(52) U.S. Cl. ................ 264/310; 264/328.1; 264/328.8; 264/328.11

(58) Field of Search ................................ 264/294, 310, 264/328.1, 328.8, 328.11

(56) References Cited

U.S. PATENT DOCUMENTS 5,413,743 A * 5/1995 Prophet ...................... 264/1.7
6,468,458 B1 * 10/2002 Anderson et al. ........... 264/246
6,555,037 B1 * 4/2003 Payne ....................... 264/40.7

* cited by examiner

*Primary Examiner*—Michael P. Colaianni
*Assistant Examiner*—Monica A. Fontaine
(74) *Attorney, Agent, or Firm*—Charles E. Baxley

(57) ABSTRACT

A method for polychrome plastic material injection molding in accordance with the present invention, in which, a molding board is provided with a plurality of cores, and the cores are each provided with a plurality of cavities. The cores rotated for exchanging the positions of the cavities and together with the rotation of the molding board, whereby permitting the injection of three different colored plastic materials into the cores respectively in turn, and then forming a triple colored plastic object.

3 Claims, 3 Drawing Sheets

METHOD FOR POLYCHROME PLASTIC MATERIAL INJECTION MOLDING

BACKGROUND OF THE INVENTION

1. Field of the Invention

The present invention relates to plastic material injection molding, and more particularly to a method for polychrome plastic material injection molding.

2. Description of the Prior Arts

A conventional method for polychrome plastic material injection molding normally by injecting polychrome plastic material into moulds respectively in turn in pattern of linear line production or multi-workstations. However, this conventional method is only fit for mass production and time consuming in changing the moulds. The world market demand is diversification-oriented, so the present producers prefer the miniature machines and coupling with the utilization of human intelligence, such that will be advantageous in flexible, easy for updating, and facilitating in small production. The pattern of linear line production or multi-workstations derived from the conventional method requires a great space and a plurality of injection molding machines, so it is impossible for production in small quantity and a number of disadvantages are caused: such as the moulds should be replaced in a given time and it is time-consuming to do it. Furthermore, giving a rise to a plenty of transportations. That is to say, by the conventional method, it's impossible to produce polychrome plastic objects only rely on single set of machine.

The present invention has arisen to mitigate and/or obviate the afore-described disadvantages of the conventional method for polychrome plastic material injection molding.

SUMMARY OF THE INVENTION

The primary objective of the present invention is to provide a method for polychrome plastic material injection molding, in which, a mold board with-a plurality of cores is able to produce polychrome plastic objects by utilizing the rotation of mold board and the cores. By such a manner, it is able to cut down the labor and increase the output to a great extent.

The further objective of the present invention is to provide a method for polychrome plastic material injection molding, which is able to overcome the disadvantages of the conventional method and equipment, such as the waste in power, labor, time and space. Thereby, the production cost is saved.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENTS

Figure 1:
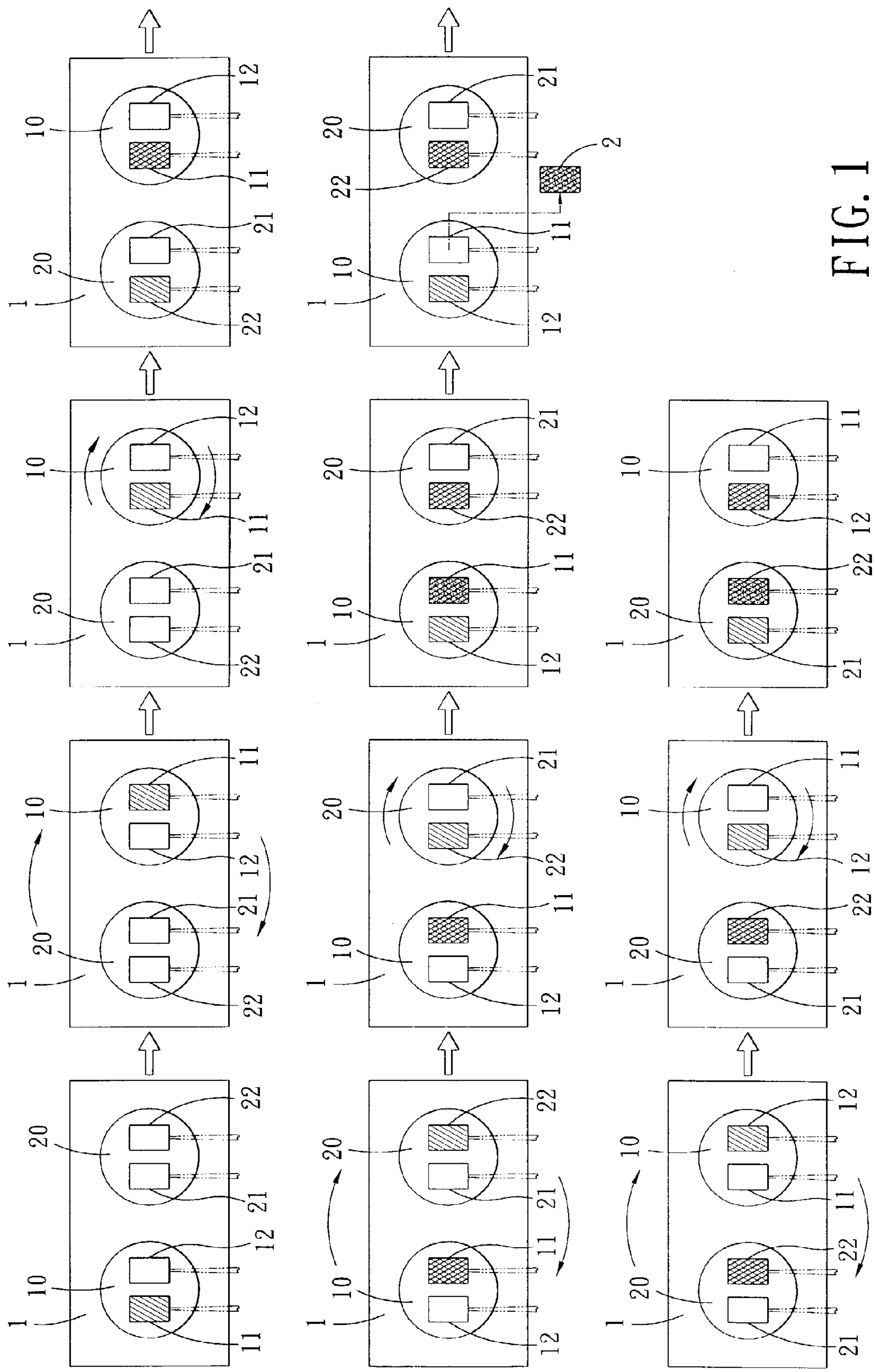
FIG. 1 is a flow diagram of a method for polychrome plastic material injection molding in accordance with a first embodiment of the present.

Referring to FIG. 1, a method for polychrome plastic material injection molding in accordance with a first embodiment of the present invention is illustrated, in which, a molding board 1 is provided with a first core 10 and a second core 20, the first core 10 is further provided with a pair of cavities 11,12, and the second core 20 is alike provided with a pair of cavities 21,22. In addition, both of the cores 10, 20 are rotatable individually and together with the rotation of the molding board 1, such that three different colored plastic materials can be injected into the cores 10, 20 respectively in turn, and then to form a triple colored plastic object therein. The method of the first embodiment in accordance with the present invention involves the following steps:

1) Initial injection of the plastic material of the first color: singly by injecting the plastic material of first color (indicated by the left-to-right risen oblique lines in the drawing) into the cavity 11 of the core 10 in the molding board 1 based on the technology of plastic injection integral molding.

2) Rotation of the molding board: with 180 degree rotating the molding board 1 so that the first core 10 and the second core 20 are exchanged in position, and then the cavities 11, 12 of the first core 10 are exchanged in position too, and so are the cavities 22, 21 of the second core 20.

3) Rotation of the first core: after the rotation of the molding board 1, then followed by a 180 degree rotation of the first core 10 so that the cavities 11 and 12 are exchanged in position.

4) Injection of the plastic material of the first and second color: by injecting the plastic material of the first color into the first cavity 22 of the second core 20, while injecting the plastic material of the second color into the first cavity 11 of the first core 10 (indicated by the right-to-left risen oblique line in the drawing), and then the first cavity 11 of the first core 10 is formed with double colored plastic material.

5) Re-rotation of the molding board: with further 180 degree rotating the molding board 1 so that the first and second core 10, 20 are exchanged in position, and then the cavities 11,12 of the first core 10 are exchanged in position too and so are the cavities 21,22 of the second core 20.

6) Rotation of the second core: after the re-rotation of the moulding board 1, the second core 20 of the molding board 1 is 180 degree rotated such that the positions of the cavities 21, 22 of the second core 20 are exchanged.

7) Injection of the plastic materials of the first, second and the third color: by injecting the plastic material of the first color into the cavity 12 of the first core 10, the plastic material of the second color into the cavity 22 of the second core 20, and the plastic material of the third color (here indicated by dots) into the cavity 11 of the first core 10. Then the cavity 11 of the first core 10 in the molding board 1 is formed with a triple-color plastic object therein, while the cavity 12 of the first core 10 is formed with a single colored plastic material, and the cavity 22 of the second core 20 is formed with a double colored plastic material thereof.

8) Taking out the finished product: once the preceding steps are finished, then take out the finished product.

9) Analogical production: after taking out the finished product, the molding board 1 and the cores 10,20 will take in form of the analogical states in given orders from the step 6 to 8. By such a manner, the triple different colored plastic material will be injected into the respective cores successively so as to cyclically form and produce the triple colored plastic objects as needed.

Figure 2:
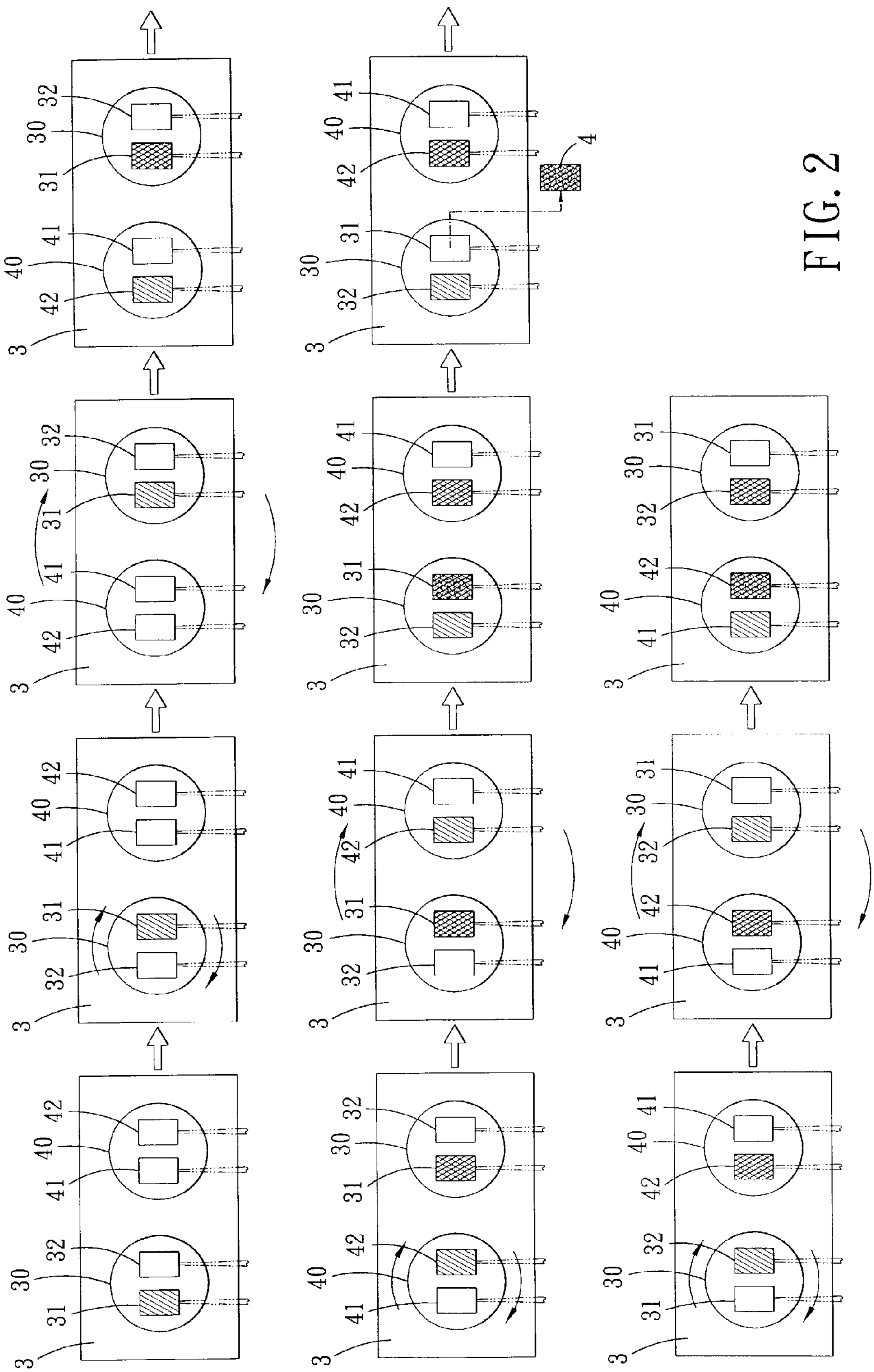
FIG. 2 is a flow diagram of a method for polychrome plastic material injection molding in accordance with a second embodiment of the present.

Referring now to FIG. 2, a method for polychrome plastic material injection molding in accordance with a second embodiment of the present invention is illustrated, which is for triple colored plastic material injection molding and identical to the method of the first embodiment of the present invention, in which, a molding board 3 is provided with a first and second core 30,40 respectively. The first core 30 is further provided with a pair of cavities 31,32, and the second core 40 is alike provided with a pair of cavities 41,42. The method of the second embodiment in accordance with the present invention involves the following steps:

1) Initial injection of the plastic material of first color: singly injecting the plastic material of first color (indicated by the left-to-right risen oblique line in the drawing) into the cavity 31 of the core 30 in the molding board 3 based on the technology of plastic injection integrally molding.

2) Rotation of the first core: by 180 degree rotating the first core 30 of the molding board 3 so that the cavities 31 and 32 are exchanged in position.

3) Rotation of the molding board: by 180 degree rotating the moulding board 3 so that the first core 30 and the second core 40 are exchanged in position, and then the cavities of the respective cores are exchanged alike in position.

4) Injection of the plastic material of the first and second color: injecting the plastic material of the first color into the first cavity 42 of the second core 40, while injecting the plastic material of the second color into the first cavity 31 of the first core 30 (indicated by the right-to-left risen oblique line in the drawing), now the first cavity 31 of the first core 30 is formed with double colored plastic material.

5) Rotation of the second core: 180 degree rotating the second core 40 of the molding board 3 such that the positions of the cavities 41, 42 of the second core 40 are exchanged.

6) Re-rotation of the molding board: further 180 degree rotating the molding board 3 so that the first and second core 30, 40 are exchanged in position, and then the cavities of the respective cores are exchanged alike in position.

7) Injection of the plastic materials of the first, second and the third color: injecting the plastic material of the first color into the cavity 32 of the first core 30, the plastic material of the second color into the cavity 42 of the second core 40, and the plastic material of the third color (here indicated by dots) into the cavity 31 of the first core 30. Then the cavity 31 of the first core 30 in the molding board 3 is formed with a triple-color plastic object 4 therein, while the cavity 32 of the first core 30 is formed with a single colored plastic material, and the cavity 42 of the second core 40 is formed with a double colored plastic material therein.

8) Taking out the finished product: once the preceding steps are finished, then take out the triple colored plastic object 4.

9) Analogical production: after taking out the finished product, the molding board 3 and the cores 30,40 will take in form of the analogical states in given orders from the step 6 to 8. By such a manner, the triple different colored plastic material will be injected into the respective cores successively so as to cyclically form and produce the triple colored plastic objects as needed.

Figure 3:
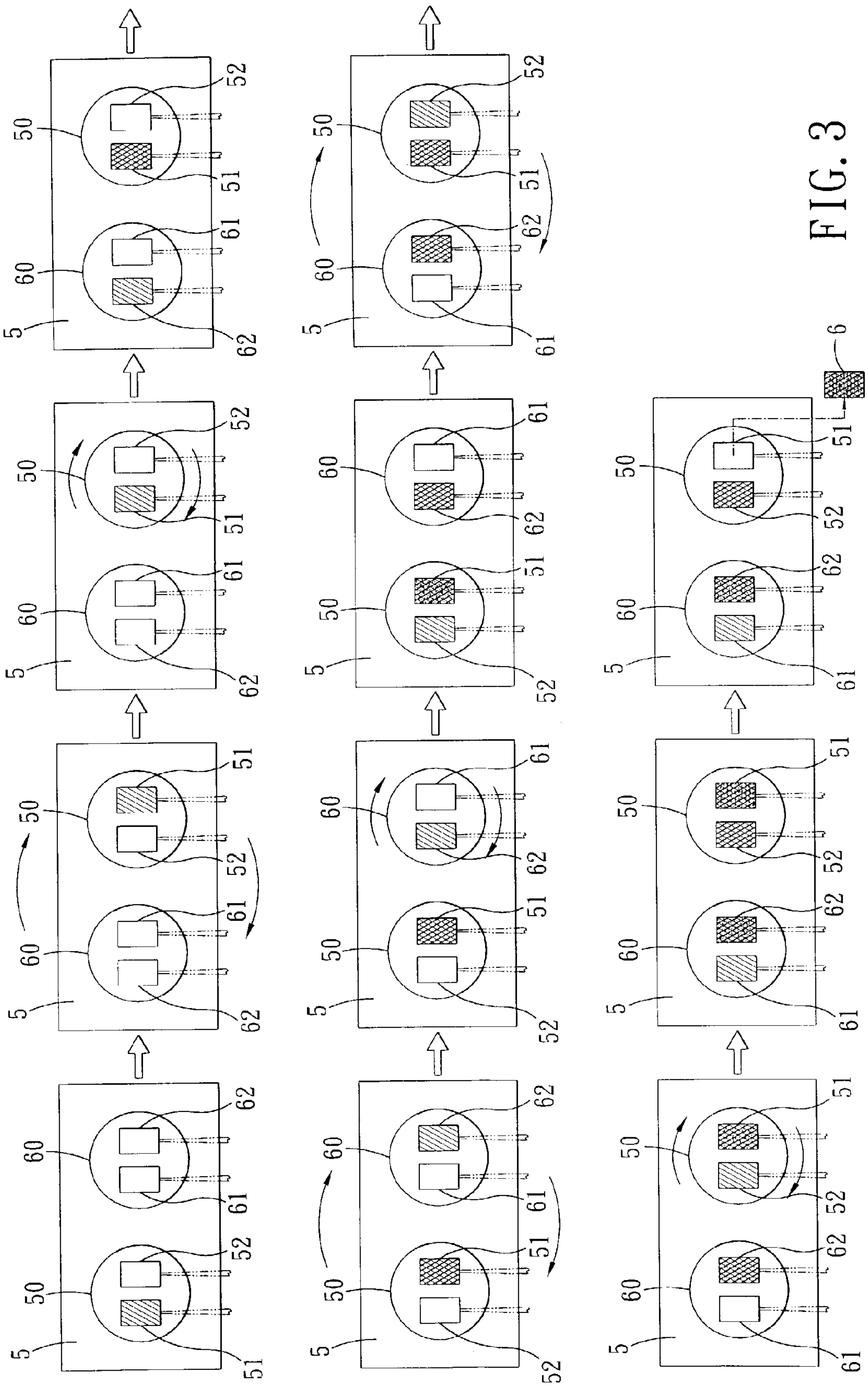
FIG. 3 is a flow diagram of a method for polychrome plastic material injection molding in accordance with a third embodiment of the present.

Referring further to FIG. 3, a method for triple colored plastic material injection molding in accordance with a third embodiment of the present invention is illustrated, which is a quadruple colored plastic material injection molding, in which, a molding board 5 is provided with a first and second core 50,60 respectively. The first core 50 is further provided with a pair of cavities 51,52, and the second core 60 is alike provided with a pair of cavities 61,62. In addition, both of the cores 50, 60 are able to rotate and together with the rotation of the molding board 5, such that four different colored plastic materials are permitted to be injected into the cavities of the cores respectively in turn, and then to form a quadruple colored plastic object (here different colors are indicated by different lines and dots). The method of the third embodiment in accordance with the present invention involves the following steps:

1) Initial injection of the plastic material of first color: singly injecting the plastic material of first color (indicated by the left-to-right risen oblique line in the drawing) into the cavity 51 of the core 50 in the molding board 5 based on the technology of plastic injection integral molding.

2) Rotation of the molding board: 180 degree rotating the molding board 5 so that the first core 50 and the second core 60 are exchanged in position, and then the cavities 51, 52 of the first core 50 are exchanged too in position, and so are the cavities 62, 61 of the second core 60.

3) Rotation of the first core: after the rotation of the molding board 5, then followed by a 180 degree rotation of the first core 50 so that the cavities 51 and 52 are exchanged in position.

4) Injection of the plastic material of the first and second color: injecting the plastic material of the first color into the first cavity 62 of the second core 60, while injecting the plastic material of the second color into the first cavity 51 of the first core 50 (indicated by the right-to-left risen oblique line in the drawing), now the first cavity 51 of the first core 50 is formed with double colored plastic material, and the first cavity 62 of the second core 60 is formed with single colored plastic material.

5) Re-rotation of the moulding board: further 180 degree rotating the molding board 5 so that the first and second core 50, 60 are exchanged in position, and then the cavities 51,52 of the first core 50 are exchanged in position too and so are the cavities 61,62 of the second core 60.

6) Rotation of the second core: after the re-rotation of the moulding board 5, the second core 60 of the molding board 5 is 180 degree rotated such that the positions of the cavities 61, 62 of the second core 60 are exchanged.

7) Injection of the plastic materials of the first, second and the third color: injecting the plastic material of the first color into the cavity 52 of the first core 50, the plastic material of the second color into the cavity 62 of the second core 60, and the plastic material of the third color (here indicated by dots) into the cavity 51 of the first core 50. Then the cavity 51 of the first core 50 in the molding board 5 formed a triple-color plastic material therein, while the cavity 52 of the first core 50 is formed with a single colored plastic material, and the cavity 62 of the second core 60 is formed with a double colored plastic material therein.

8) Rotation of the moulding board: once the preceding steps are finished, and then 180 degree rotating the moulding board 5 so that the first core 50 and the second core 60 are exchanged in position again, and then the cavities of the corresponding cores are exchanged in position too.

9) Rotation of the first core: after the rotation of the molding board 5 in the step 8, then followed by a further 180 degree rotation of the first core 50 so that the cavities 51 and 52 are exchanged in position again.

10) Injection of the plastic materials of the first, second, third and the fourth color respectively: injecting the plastic material of the first color into the cavity 61 of the second core 60, the plastic material of the second color into the cavity 52 of the first core 50, the plastic material of the third color into the cavity 62 of the second core 60, and the fourth color (here indicated by horizontal lines) into the cavity 51 of the first core 50. Then the cavity 51 of the first core 50 in the moulding board 5 is formed with a quadruple-color plastic object therein, while the cavity 52 of the first core 50 is formed with a double-color plastic material, the cavity 62 of the second core 60 is formed with a triple-color plastic material, and the cavity 61 of the second core 60 is formed with a single-color plastic material.

11) Taking out the finished product: once the preceding steps are finished, then take out the quadruple-color plastic object 4.

12) Analogical production: after taking out the finished product, the molding board and the two cores will take in form of the analogical states in given orders from the step 7 to 11. By such a manner, the four different colored plastic materials will be injected into the cavities 51,52 of the first core 50 as well as the cavities 61,62 of the second core 60 cores successively so as to cyclically take in form of and produce the quadruple-color plastic objects as needed.

It is concluded from the description of the embodiments described above that the method for polychrome plastic material injection molding in accordance with the present invention is characterized in:

1) The method for polychrome plastic material injection molding in accordance with the present invention only by utilizing a molding board provided with a plurality of cores and with a rotating manner such that allow the injection of polychrome plastic materials into the moulds and being formed therein. Thereby the method of the present invention is not only favorable in saving working and installation space but also conducive to cut down the labor, save the production cost and increase the output.

2) The method for polychrome plastic material injection molding in accordance with the present invention, by virtue of which, it only needs to change the moulds in case of producing polychrome plastic objects in varied sizes, and the whole machine may singly and mechanically run. Thereby the requirement for mill and installation space is flexible and further diminishes the waste in transportation between the workstations.

While we have shown and described various embodiments in accordance with the present invention, it should be clear to those skilled in the art that further embodiment may be made without departing from the scope of the present invention.

What is claimed is:

1. A method for polychrome plastic material injection molding, comprising: a molding board provided with a plurality of cores and further the cores each provided with a plurality of cavities, the cores rotated for exchanging the position of the cavities and together with the rotation of the molding board, whereby permitting the injection of three different colored plastic materials into the cores respectively in turn, and then forming a triple colored plastic object;

wherein the method for polychrome plastic material injection molding is a triple colored plastic material injection molding, a molding board provided with a first and second core respectively, alike, the cores are each provided with a pair of cavities, the method comprising the following steps:

1) Initial injection of the plastic material of first color: singly injecting the plastic material of first color into a cavity of the first core in the molding board based on the technology of plastic injection integral molding;

2) Rotation of the molding board: 180 degree rotating the molding board such that the first core and the second core exchanged in position, and then the cavities of the corresponding cores exchanged in position too;

3) Rotation of the first core: after the rotation of the molding board, then followed by a 180 degree rotation of the first core for exchanging the positions of the cavities of the first core;

4) Injection of the plastic material of the first and second color: injecting the plastic material of the first color into a cavity of the second core, while injecting the plastic material of the second color into a cavity of the first core;

5) Re-rotation of the molding board: further 180 degree rotating the molding board for exchanging the positions of the first and second cores, and then the cavities of the corresponding cores exchanged in position too;

6) Rotation of the second core: after the re-rotation of the molding board, the second core of the molding board being 180 degree rotated for exchanging the positions of the cavities of the second core;

7) Injection of the plastic materials of the first, second and the third color: injecting the plastic material of the first color into another cavity of the first core, the plastic material of the second color into a cavity of the second core, and the plastic material of the third color into a cavity of the first core, then the cavity of the first core in the molding board formed with a triple-color plastic object therein, while another cavity of the first core formed with a single colored plastic material, and the cavity of the second core formed with a double colored plastic material thereof;

8) Taking out the finished product: once the preceding steps are finished, then taking out the finished product;

9) Analogical production: after taking out the finished product, the molding board and the cores taking in form of the analogical states in given orders from the step 6 to 8, by such a manner, the triple different colored plastic material to be injected into the respective cores successively for cyclically forming and producing the triple colored plastic objects as needed.

2. A method for polychrome plastic material injection molding, comprising: a molding board provided with a plurality of cores and further the cores each provided with a plurality of cavities, the cores rotated for exchanging the position of the cavities and together with the rotation of the molding board, whereby permitting the injection of three different colored plastic materials into the cores respectively in turn, and then forming a triple colored plastic object, wherein the method for polychrome plastic material injection molding is a triple colored plastic material injection molding, a molding board provided with a first and second core respectively, alike, the cores are each provided with a pair of cavities, the method comprising the following steps:

1) Initial injection of the plastic material of first color: singly injecting the plastic material of first color into a cavity of the first core in the molding board based on the technology of plastic injection integral molding;

2) Rotation of the first core: 180 degree rotating the first core for exchanging the positions of the cavities of the first core;

3) Rotation of the molding board: 180 degree rotating the molding board for exchanging the positions of the first core and the second core, and then the cavities of the corresponding cores exchanged in position too;

4) Injection of the plastic material of the first and second color: injecting the plastic material of the first color into a cavity of the second core, while injecting the plastic material of the second color into a cavity of the first core;

5) Rotation of the second core: 180 degree rotating the second core of the molding board for exchanging the positions of the cavities of the second core;

6) Re-rotation of the molding board: further 180 degree rotating the molding board for exchanging the positions of the first and second cores, and then the cavities of the corresponding cores exchanged in position too;

7) Injection of the plastic materials of the first, second and the third color: injecting the plastic material of the first color into another cavity of the first core, the plastic material of the second color into a cavity of the second core, and the plastic material of the third color into a cavity of the first core, then the cavity of the first core in the molding board formed with a triple-color plastic object therein, while another cavity of the first core formed with a single colored plastic material, and the cavity of the second core formed with a double colored plastic material thereof;

8) Taking out the finished product: once the preceding steps are finished, then taking out the finished product;

9) Analogical production: after taking out the finished product, the molding board and the cores taking in form of the analogical states in given orders from the step 6to 8, by such a manner, the triple different colored plastic material to be injected into the respective cores successively for cyclically forming and producing the triple colored plastic objects as needed.

3. A method for polychrome plastic material injection molding, comprising: a molding board provided with a plurality of cores and further the cores each provided with a plurality of cavities, the cores rotated for exchanging the position of the cavities and together with the rotation of the molding board, whereby permitting the injection of three different colored plastic materials into the cores respectively in turn, and then forming a triple colored plastic object, wherein the method for polychrome plastic material injection molding is a quadruple-color plastic material injection molding, a molding board provided with a first and second core respectively, alike, the cores are each provided with a pair of cavities, the method comprising the following steps:

1) Initial injection of the plastic material of first color: singly injecting the plastic material of first color into a cavity of the first core in the molding board based on the technology of plastic injection integral molding;

2) Rotation of the molding board: 180 degree rotating the molding board for exchanging the positions of the first core and the second core, and then the cavities of the corresponding cores exchanged in position too;

3) Rotation of the first core: after the rotation of the molding board, then followed by a 180 degree rotation of the first core for exchanging the positions of the cavities of the first core;

4) Injection of the plastic material of the first and second colors respectively: injecting the plastic material of the first color into a cavity of the second core, while injecting the plastic material of the second color into a cavity of the first core;

5) Re-rotation of the molding board: further 180 degree rotating the molding board for exchanging the positions of the first and second cores, and then the cavities of the corresponding cores exchanged in position too;

6) Rotation of the second core: after the re-rotation of the molding board, the second core of the molding board being 180 degree rotated for exchanging the positions of the cavities of the second core;

7) Injection of the plastic materials of the first, second and the third color: injecting the plastic material of the first color into another cavity of the first core, the plastic material of the second color into a cavity of the second core, and the plastic material of the third color into a cavity of the first core, then the cavity of the first core in the molding board formed with a triple-color plastic object therein, while another cavity of the first core formed with a single colored plastic material, and the cavity of the second core formed with a double colored plastic material thereof;

8) Rotation of the moulding board: once the preceding steps being finished, and then 180 degree rotating the molding board for exchanging the positions of the first and the second core again, and then the position of cavities of the corresponding cores being exchanged too;

9) Rotation of the first core: after the rotation of the molding board in the step 8, then followed by a further 180 degree rotation of the first core for exchanging the positions of the cavities thereof;

10) Injection of the plastic materials of the first, second, third and the fourth color respectively: injecting the plastic material of the first color into another cavity of the second core, the plastic material of the second color into another cavity of the first core, the plastic material of the third color into a cavity of the second core, and the fourth color into a cavity of the first core, then the cavity of the first core in the moulding board formed with a quadruple-color plastic object therein, while another cavity of the first core formed with a double-color plastic material, the cavity of the second core formed with a triple-color plastic material, and the another cavity of the second core formed with a single-color plastic material;

11) Taking out the finished product: once the preceding steps are finished, then take out the quadruple-color plastic object;

12) Analogical production: after taking out the finished product, the molding board and the two cores taking in form of the analogical states in given orders from the step 7 to 11, by such a manner, the four different colored plastic materials to be injected into the cavities of the corresponding cores successively for cyclically forming and producing the quadruple-color plastic objects as needed.

* * * * *